United States Patent [19]

Takahashi et al.

[11] Patent Number: 4,656,552
[45] Date of Patent: Apr. 7, 1987

[54] CAM DRIVEN ACTUATING MECHANISM FOR A TAPE PLAYER

[75] Inventors: Akira Takahashi, Nagoya; Isao Hasegawa, Toda, both of Japan

[73] Assignee: Clarion Co., Ltd., Tokyo, Japan

[21] Appl. No.: 643,224

[22] Filed: Aug. 21, 1984

[30] Foreign Application Priority Data

Aug. 30, 1983 [JP] Japan .................. 58-135026

[51] Int. Cl.⁴ .......................... G11B 5/012
[52] U.S. Cl. .................. 360/137; 360/105; 360/90
[58] Field of Search ............ 360/93, 90, 105, 96.1, 360/96.2, 96.3, 96.4, 69, 137; 242/199, 200, 201, 206, 208, 209

[56] References Cited

U.S. PATENT DOCUMENTS

| 4,399,475 | 8/1983 | Shimomae | 360/96.3 |
| 4,420,783 | 12/1983 | Suezawa et al. | 360/90 X |
| 4,425,591 | 1/1984 | Ito et al. | 360/96.3 X |
| 4,495,535 | 1/1985 | Kohri et al. | 360/137 X |
| 4,531,168 | 7/1985 | Suzuki | 360/90 X |
| 4,547,823 | 10/1985 | Ri et al. | 360/93 X |

FOREIGN PATENT DOCUMENTS

| 0069551 | 4/1982 | Japan | 360/137 |
| 0207052 | 11/1984 | Japan | 360/69 |

Primary Examiner—Robert S. Tupper
Assistant Examiner—Andrew L. Sniezek
Attorney, Agent, or Firm—Flynn, Thiel, Boutell & Tanis

[57] ABSTRACT

A cam driven actuating mechanism for use in a tape player includes a drive source, a cam driven by the drive source, a control arm actuated by the cam profile of the cam, and a solenoid to hold the control arm at a given position off the cam. The cam includes a resilient projection along the cam profile which bulges out from the cam profile to push the control arm in a direction to assist the solenoid to catch the control arm, and the bulging amount of the resilient projection is slightly larger than the stroke needed for the control arm to be caught by the solenoid.

14 Claims, 10 Drawing Figures

CAM DRIVEN ACTUATING MECHANISM FOR A TAPE PLAYER

FIELD OF THE INVENTION

This invention relates to a cassette tape recording and reproducing apparatus with a logic control mechanism and more particularly to a cam driven actuating mechanism used in the logic control mechanism.

BACKGROUND OF THE INVENTION

Cam driven actuating mechanisms in general include an arm which is driven by a cam in accordance with rotation thereof. Some mechanisms employ an attraction solenoid to attract the arm and hold it at a given position. Although it is most usual that a resilient member such as a coil spring is employed to bias the arm toward and solenoid so that the solenoid does not fail to capture the arm, some practical circumstances require employment of a resilient member which biases the arm away from the solenoid.

If the arm is biased away from the solenoid, it is only the cam profile that governs whether the arm is reliably attracted by the attraction solenoid or not. It is extremely difficult, however, to reliably effect the attraction and holding of the arm in the absence of the resilient member biasing the arm toward the solenoid, because manufacturing errors are inevitable in the cam profile or in the positional relationship between the cam and the arm.

OBJECT OF THE INVENTION

It is therefore an object of the invention to provide a cam driven actuating mechanism including a spring biasing the arm away from the attraction solenoid, which mechanism never fails to capture the arm by the solenoid despite the opposite force of the spring, irrespective of relatively large errors in the cam profile and in the positional relationship between the cam and the arm.

SUMMARY OF THE INVENTION

This object is attained by a cam driven actuating mechanism in a tape player comprising:
 a rotatable drive source;
 a disc intermittently engageable with and driven by said drive source;
 a cam provided on one face of said disc;
 a control arm engaging said first cam to be actuated by the cam profile of said cam along with rotation of said disc;
 a solenoid to hold said control arm at a position corresponding to a selected operating mode of the tape player;
 a stopper provided along said cam profile to engage said control arm in the stop mode of the tape player;
 means to disengage said arm from said stopper;
 a resilient projection formed along the bulging out from said cam profile of said cam to push said control arm in a direction to assist said solenoid to catch said control arm, said resilient projection bulging out by an amount larger than the stroke for said control arm to be caught by said solenoid.

The invention will be better understood from the description given below by way of a preferred embodiment illustrated.

BRIEF DESCRIPTION OF THE DRAWINGS

The drawings illustrate a cam driven actuating mechanism embodying the invention, in which.

DETAILED DESCRIPTION OF THE PREFERRED EMBODIMENT

Figure 1:
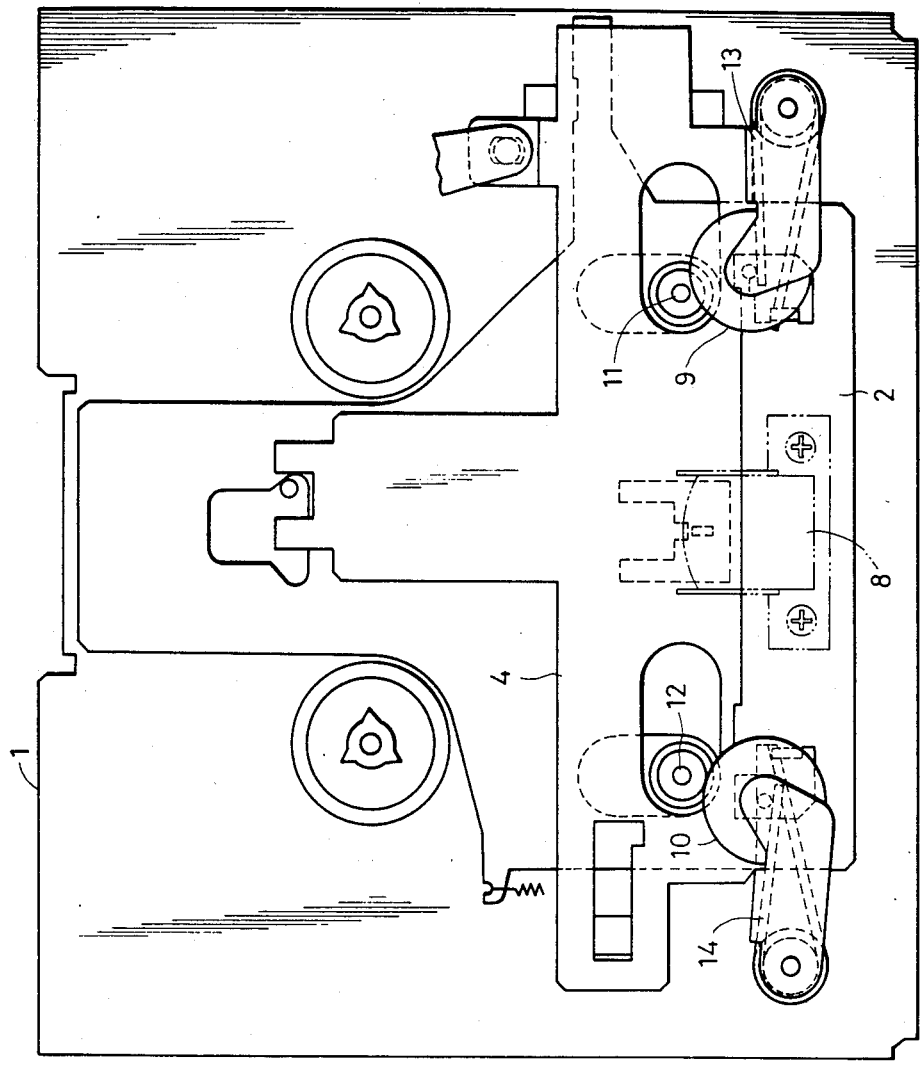
FIG. 1 is a plan view of a tape reproducing apparatus.
Figure 2:
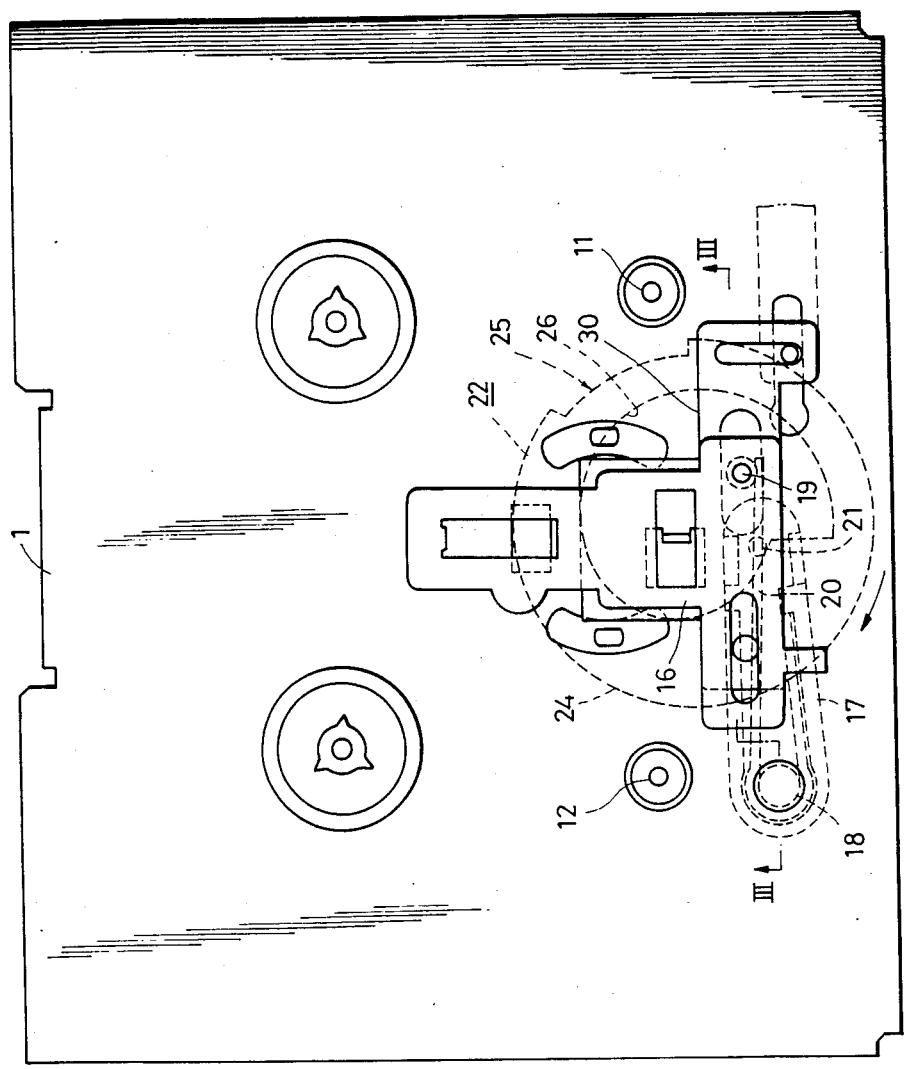
FIG. 2 is a plan view of the tape reproducing apparatus of FIG. 1 which particularly shows a mode plate and a power plate.
Figure 3:
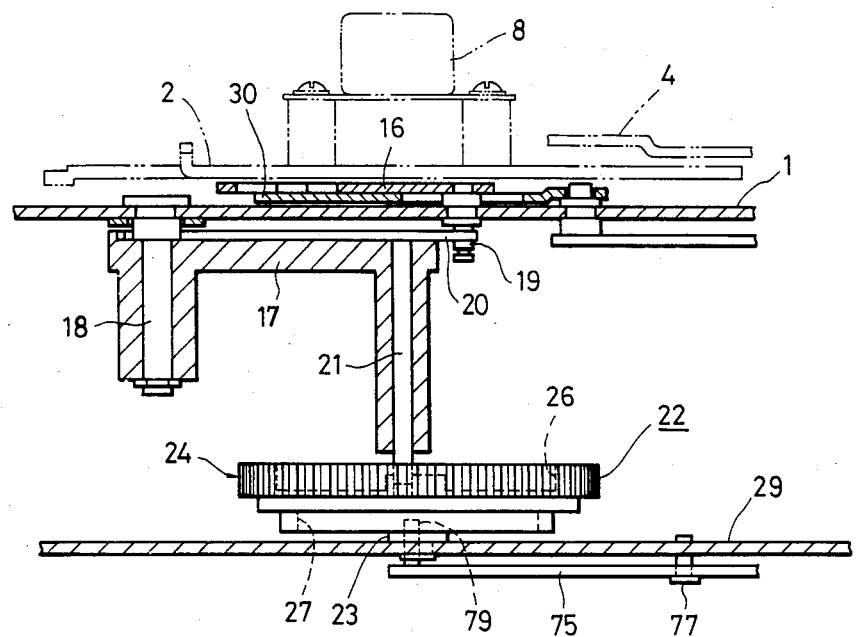
FIG. 3 is a cross-sectional view taken along line III—III of FIG. 2.

In FIGS. 1 through 3, reference numeral 1 designates a chassis, 2 denotes a head base, and 4 represents a forward-reverse switching plate. The head base 2 is movable up and down in FIG. 1 with respect to the chassis 1, and the illustrated head base 2 is at its most advanced position. The head base 2 carries thereon a reproduction head 8 as shown in FIGS. 1 and 3.

The forward-reverse switching plate 4 is supported on the head base 2 slidably to the left from the rightmost position of FIG. 1. Forward-drive and reverse-drive pinch rollers 9 and 10 are supported by respective levers pivotable about axes on the chassis 1 and are biased by springs 13 and 14 toward and for close contact with respective associated capstans 11 and 12. The positions of the head base 2 and of the switching plate 4 determine whether the pinch rollers 9 and 10 closely contact or stand away from the respective associated capstans 11 and 12. Namely, with the illustrated aspect of FIG. 1 wherein the head base 2 is at the most advanced position and the switching plate 4 is at the rightmost position, the forward-drive pinch roller 9 on the right is in close contact with the capstan 11, whereas the reverse-drive pinch roller 10 on the left is away from engagement with the capstan 12. The capstans 11 and 12 are rotated in opposite directions by a motor which is not shown.

It will be understood that FIGS. 1 through 3 illustrate the forward play (reproduction) mode, because both pinch rollers 9 and 10 and the head base 2 are at their most advanced positions.

Referring to FIGS. 2 and 3, a power plate 16 is disposed under the head base 2 and above a mode plate 30 which will be described later. The power plate 16 is slidable with respect to the chassis 1 in the same direction as the moving direction of the head base 2. The power plate 16 is illustrated at the most advanced position. A drive arm 17 is mounted under the chassis 1 and is pivotably supported at the proximal end thereof by an axis 18. A spring 20 secured to the drive arm 17 transmits the rotation of the drive arm to the power plate 16 and to a pin 19 penetrating and projecting below the chassis 1 through an elongated hole (not shown). The drive arm 17 has integrally formed thereon a downwardly extending rod 21 at the tip thereof as shown in FIG. 3 to engage a power cam 26 which will be described later.

A base plate 29 (FIG. 3) is united with the chassis 1, with a space therebetween for mounting various parts or components. The base plate 29 carries thereon a disc 22 rotatably supported by an axis 23 (FIG. 3). The disc 22 has a geared circumference 24 which is partly broken by a cut 25 with no dent for a reason which will be described later. The disc 22 has integrally formed on the upper face thereof a flat-shaped power cam 26 which is more clearly illustrated in FIGS. 2 and 4. The lower end of the rod 21 of the drive arm 17 engages the power cam 26. Thus, with rotation of the disc 22, the drive arm 17 pivots responsively to the profile of the power cam 26, so that the spring 20 pushes the pin 19 to make the power plate 16 advance, or alternatively retreats from the pin 19 to let the power plate 16 retreat.

The mode plate 30 which was referred to before is disposed between the chassis 1 and the power plate 16. The mode plate 30 is not only slidable together with the power plate 16 in the same direction as the movement direction of the head base 2, but is also slidable relative to the power plate 6 in the right and left directions in FIGS. 2 and 3.

Figure 5:
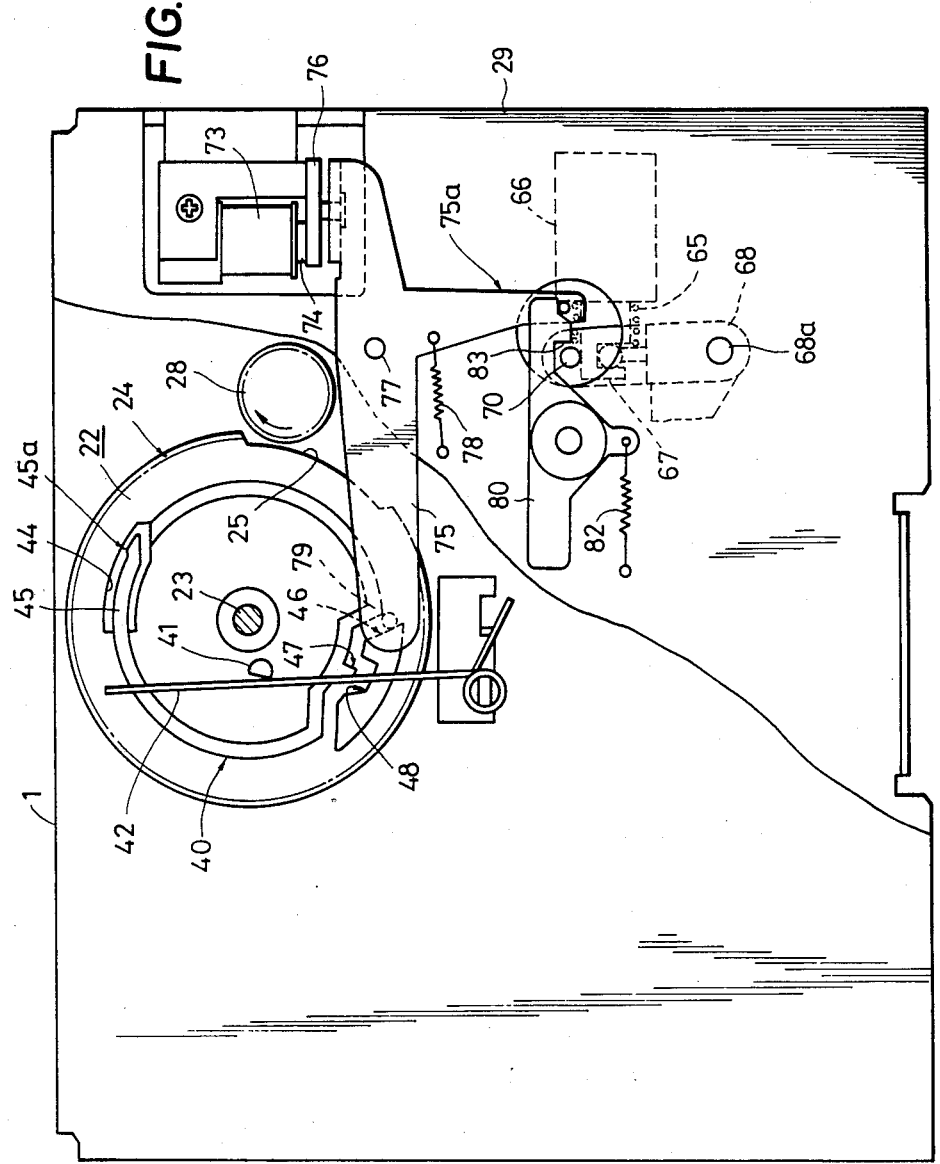
FIG. 5 is a bottom view of the arrangement of FIG. 2.

Referring to FIG. 5, which is a bottom view of the arrangement of FIG. 2, the disc 22 has a timing cam 40 formed back to back with the power cam 26. A drive gear 28 with a smaller diameter is united to and coaxial with the forward-drive capstan 11 and is engageable with the geared circumference 24 of the disc 22. In the forward (or reverse) play mode illustrated, however, the drive gear 28 is positioned at the cut 25 of the gear 24.

Still referring to FIG. 5, an attraction solenoid 73 is secured in a position on the base plate 29, with a core 74 which is magnetized by energization of the solenoid 73. The base plate 29 also carries a control arm 75 pivotably supported by an axis 77. At the left end of the control arm 75 is secured a follow pin 79 which is moved by the profile of the timing cam 40, and at the right end of the control arm 75 is mounted a core plate 76 which is attracted by the core 74 upon energization of the attraction solenoid 73. The core plate 76 is preferably made from a material which readily loses residual magnetism.

Figure 6:
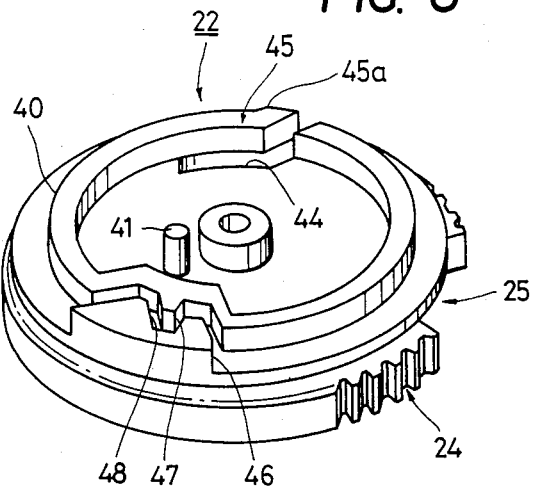
FIG. 6 is a perspective view of a timing cam which is a component of the mechanism of FIG. 1.

As shown in FIGS. 5 and 6, the disc 22 has a pin 41 on the same surface as the timing cam 40. The pin 41 is located near the axis 23 and projects parallel with the same. A torsion spring 42 secured to the chassis 1 engages the pin 41 so as to bias the disc 22 in the rotating direction thereof (counterclockwise direction in FIG. 5). The cam profile of the timing cam 40 includes a lock portion 46, stop portion 47 and standby portion 48 which all prevent the disc 22 from rotating in the above-mentioned direction when the follow pin 79 engages them.

The timing cam 40 also a resilient member 45 at a position with 180° difference from the stop portion 47. The resilient member 45 is a part of the cam profile, and is united to the disc 22 merely at one end portion thereof, with the other part separated from the disc 22 by a slit 44. The disc 22 is preferably made from a plastic resin to give the resilient member 45 a sufficient resiliency. The resilient member 45 has a projection 45a bulging radially outwardly at the tip thereof. The projection 45a also makes a part of the cam profile of the timing cam 40 to function as described later.

As shown in FIG. 5, a suction solenoid 66 is secured to the base plate 29, and has a core 67 which is drawn to the right in FIG. 5 upon energization of the solenoid 66. A core arm 68 connected to the core 67 for responsive movement thereto is rotatably mounted on the base plate 29 by an axis 68a.

Figure 4:
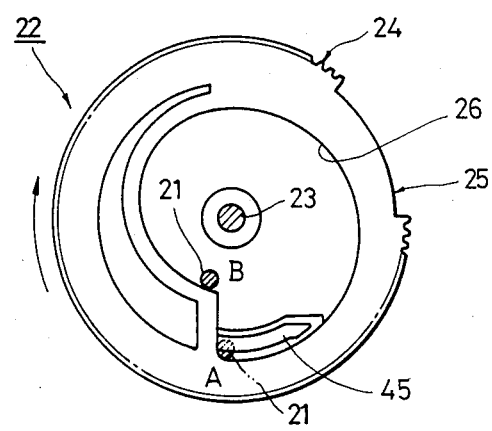
FIG. 4 is a plan view of a power cam which is a component of the mechanism of FIG. 1.

With this arrangement of the cassette tape reproducing apparatus, assuming that the head base 2 and the power plate 16 (including the mode plate 30) are at retreated positions before advancement to the forward play mode illustrated, the rod 21 of the drive arm 17 moved by the power cam 26 is at position A shown by the imaginary line in FIG. 4. This is just the stop mode of the apparatus. With a manual operation to select a desired mode, the mode plate 30 and the forward-reverse changeover plate 4 slide to the right or left in FIG. 2 to positions corresponding to the selected mode. With a given time (described later), both plates 30 and 4 arrive at and stand in position, and then the power cam 26 (and hence the disc 22) starts rotating in the arrow head direction in FIG. 4. Accordingly, the rod 21 of the drive arm 17 gradually moves from the position A toward the center of the cam 26, following the cam profile. This displacement rotates the drive arm 17 and makes the power plate 16 advance from the retreated position together with the mode plate 30. The movement of the mode plate 30 attempts to bring ahead the head base 2 and the head 8. However, when the selected mode does not require so, a mechanism not shown keeps the head base 2 completely immovable or movable a little despite the movement of the mode plate 30. The mode wherein the head base 2 is immovable at all is the fast-forwarding or rewinding mode whereas the mode where the head base 2 is movable a little is the cue scanning mode in fast-forwarding or rewinding drive. The mode wherein the head base 2 and the mode plate 30 are at the most advanced positions is the forward play or reverse play mode. It is the position of the switching plate 4 that determines whether the mode is the forward play or the reverse play mode.

The timing cam 40 controls the disc 22 (power cam 26) to rotate or stop it at a timing as described below.

Figure 7:
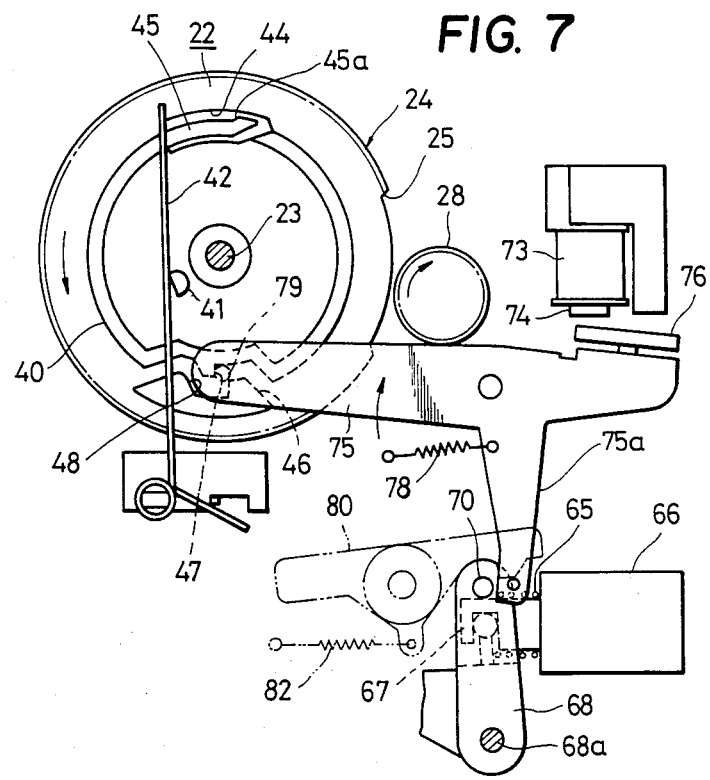
FIGS. 7 through 10 show respective operational positions of the members illustrated in FIG. 5.

Assuming that the reproducing apparatus is now in the stop mode, the respective components or parts which have been in the forward play mode in FIG. 5 take the positions as shown in FIG. 7. In this stop mode of FIG. 7, the control arm 75 is biased in the clockwise direction by the tension spring 78 so that the follow pin 79 thereof engages the stop portion 47 of the timing cam 40. Although the disc 22 (timing cam 40) receives the energy of the torsion spring 42 in the counterclockwise direction, it is maintained in its stop mode by the engagement of the follow pin 79 with the stop portion 47. It should be noted that the power cam 26 (not shown in FIG. 7) takes the angular position to put the rod 21 of the drive arm 17 at position A of FIG. 4.

Figure 8:
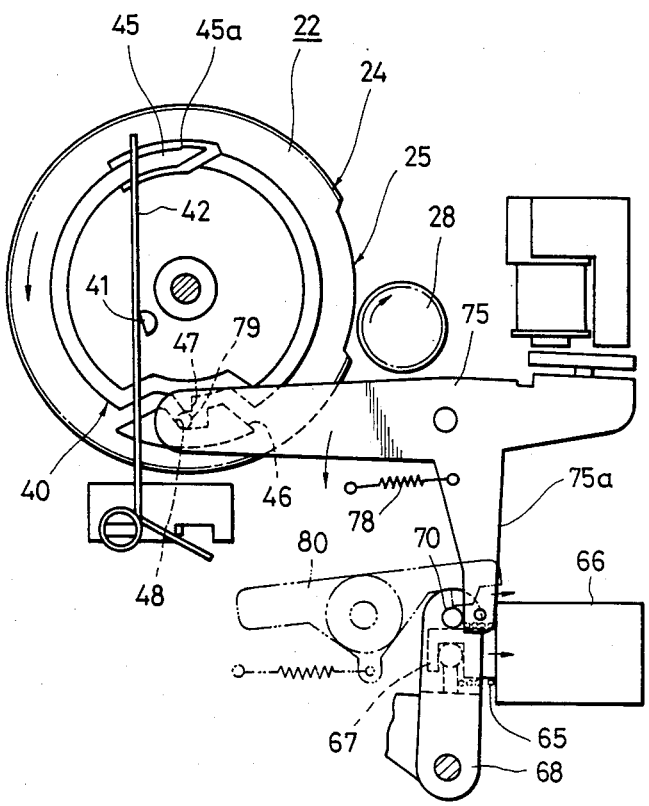

Assuming that the play button is depressed in the state of FIG. 7, the suction solenoid 66 is energized and draws the core 67 to rotate the core arm 68 to a position shown in FIG. 8. The rotation of the arm 68 activates a mechanism not shown to make the switching plate 4 and the mode plate 30 slide.

The rotation of the core arm 68 also causes a projection 70 thereof to push an extension 75a of the control arm 75 to the right in the Figures. As the result, the control arm 75 rotates in the arrow mark direction (in the counterclockwise direction) in FIG. 8 against the tension spring 78 so that the follow pin 79 disengages the stop portion 47 of the timing cam 40. This allows the disc 22 (timing cam 40) to slightly rotate with the energy of the torsion spring 42. However, the disc 22 stops soon because the follow pin 79 thereof engages the standby portion 48 of the cam 40.

Figure 9:
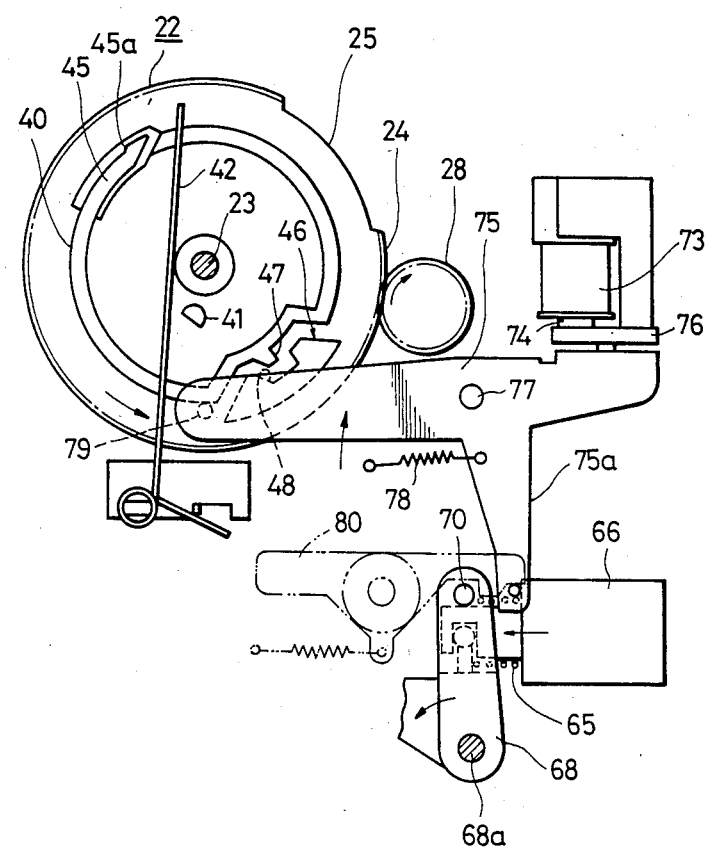

When the switching plate 4 and the mode plate 30 move to the positions corresponding to the command from the manually-operated button, the suction solenoid 66 is deenergized. The core 67 is thus ejected out by the coil spring 65 and allows the core arm 68 to rotate and return to the original position as shown in FIG. 9. As the result, said mechanism not shown to drive the switching plate 4 and the mode plate 30 is locked inoperative so that both plates 4 and 30 stop at the positions corresponding to the selected mode.

The rotation of the core arm 68 to the original position releases the control arm 75 from the projection 70 and allows it to rotate with the energy of the tension spring 78 in the arrow mark direction of FIG. 9 (in the counterclockwise direction) from the position of FIG. 8 so that the follow pin 789 disengages the standby portion 48 of the timing cam 40. The disc 22 is allowed to slightly rotate with the energy of the torsion spring 42 until the gear 24 along the circumference thereof engages the drive gear 28. Thus the disc 22 begins to rotate as shown in FIG. 9.

Figure 10:
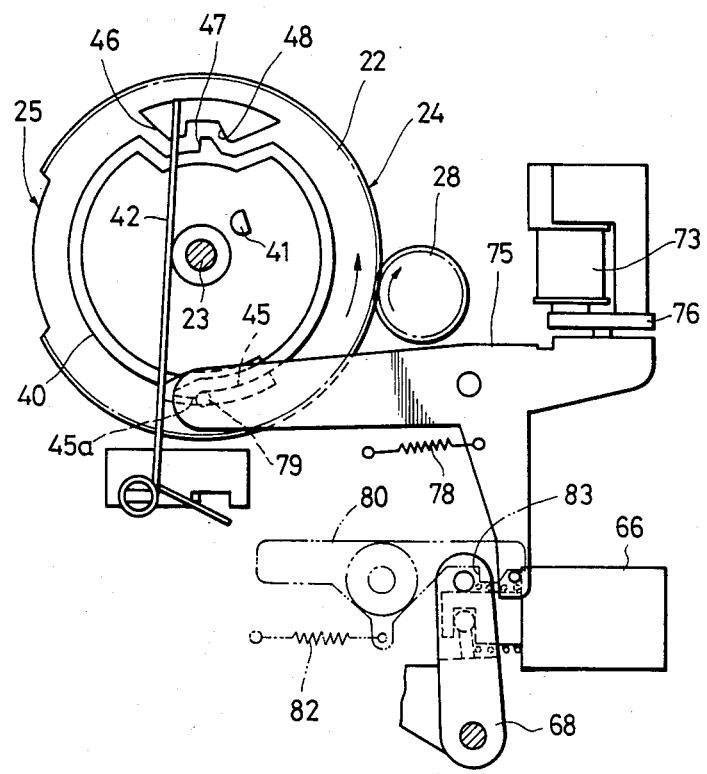

After the disc 22 begins to rotate, the attraction solenoid 73 is energized so that the core 74 attracts the core plate 76 of the control arm 75. It should be noted here that this attraction is effected reliably as follows. Namely, soon after the solenoid 73 is energized, the follow pin 79 of the control arm 75 is brought into contact with the resilient member 45 of the timing cam 40 as shown in FIG. 10 and is slightly pushed in the counterclockwise direction by the projection 45a at the tip of the resilient member 45 so as to bring the core plate 76 into contact with the core 74. In this respect, as this rotation of the control arm 75 is extremely small, it is difficult to manufacture the projection 45a so that the bulging amount thereof coincides with the necessary stroke of the control arm 75. Therefore, the projection 45a is configured to bulge out farther than necessary to effect the stroke required of the control arm 75. The bulging amount of the projection 45a exceeding the amount required to bring the core plate 76 to the core 74 can be disregarded because the resilient member 45 is deformable and resiliently absorbs the excessive force so as not to push the arm 75 too much.

Thus the core plate 75 is reliably attracted and held by the core 74 despite the tension spring 78 biasing the control arm in the opposite direction. As the disc 22 rotates and reaches the position of FIG. 5, the cut 25 breaking the gear 24 becomes opposed to the drive gear 28 so that the rotation transmission from the drive gear 28 to the timing cam 27 is interrupted. At this time, the follow pin 79 of the control arm 75 engages the lock portion 46 of the timing cam 40 and keeps the disc 22 immovable in this angular position. Additionally, the power cam 26 is at the position of FIG. 2 to put the rod 21 of the drive arm 17 at position B of FIG. 4. Thus the apparatus is set at the desired mode (forward play mode, for example) selected by the manually-operated button.

Thereafter, when a tape reproduction is finished, for example, the attraction solenoid 73 is deenergized by an electric signal supplied responsively. This allows the control arm 75 to rotate again with the force of the spring 78 from the position of FIG. 5 to the position of FIG. 7, i.e. in the stop mode of the apparatus.

For a time after the suction solenoid 66 is deenergized as shown in FIG. 9 and before it is reenergized as shown in FIG. 7, the projection 70 of the core arm 68 is engaged by a hook 83 of a misoperation preventing arm 80 biased by a spring 82 to keep the projection 70 off the core 67 of the core arm 68. This prevents a possible erroneous operation upon an accidental energization of the mode solenoid 66 during tape reproduction.

As described above, the cam driven actuating mechanism according to the invention provides the cam with the resilient projection to facilitate attraction thereof by the solenoid, and the bulging height of the projection is slightly larger than the stroke required to bring the control arm into attraction by the solenoid. Therefore, attraction of the arm by the solenoid is reliably effected despite an inaccuracy in the cam profile or in the positional relationship between the cam and the control arm.

The embodiments of the invention in which an exclusive property or privilege is claimed are defined as follows:

1. In a cam driven actuating mechanism for a tape player which includes:
    a drive source;
    a rotatably supported disc and selectively actuable means for drivingly coupling said drive source to said disc so as to effect rotation of said disc;
    a cam provided on a surface of said disc and having thereon a cam profile;
    a pivotally supported control arm engageable with said cam profile of said cam so as to selectively permit and prevent rotation of said disc, said cam profile having a stop which engages said control arm in a stop mode of the tape player;
    attraction solenoid means for releasably holding said control arm in a position in which a portion thereof is adjacent said attraction solenoid means when said cam is in a predetermined angular position corresponding to a selected operating mode of the tape player; and
    means for disengaging said control arm from said stop;
    the improvement comprising a resilient projection which is provided along and bulges outwardly from said cam profile of said cam and which, as said disc approaches said predetermined angular position, pivots said control arm in a direction causing said portion thereof to move into engagement with and to be releasably held by said attraction solenoid means, said resilient projection bulging farther outwardly than is needed to cause said portion of said control arm to engage and be releasably held by said solenoid means.

2. The cam driven actuating mechanism of claim 1, further comprising:
    an additional cam provided on an additional surface of said disc;
    a drive arm supported for pivotal movement about an axis;
    a rod which is provided on said drive arm at a location spaced from said axis and which engages said additional cam; and
    means responsive to pivotal movement of said drive arm by said additional cam for moving a head base to a position corresponding to a respective selected operating mode of the tape player.

3. The cam driven actuating mechanism of claim 1, wherein said means for disengaging said control arm from said stop includes a suction solenoid and means responsive to actuation of said suction solenoid for pivoting said control arm in a direction causing said control arm to move out of engagement with said stop.

4. The cam driven actuating mechanism of claim 3, further including means for selectively inhibiting movement of said control arm by said suction solenoid in order to prevent an erroneous operation of the tape player due to an inadvertent energization of said suction solenoid.

5. A cam driven actuating mechanism for a tape player, comprising:
  a movably supported cam member having thereon a cam surface, said cam surface having an outwardly projecting portion;
  selectively actuable means for effecting movement of said cam member;
  a movably supported control arm having a first portion which is slidably engageable with said cam surface;
  a solenoid capable, when actuated, of electromagnetically attracting a second portion of said control arm, but only when said second portion is in very close proximity to said solenoid, wherein when said outwardly projecting portion of said cam surface engages said first portion of said control arm during movement of said cam member it moves said control arm in a direction causing said second portion of said control arm to move into engagement with said solenoid; and
  means for facilitating movement of said portion of said cam surface in directions approximately parallel to the directions of movement of said first portion of said control arm and means for yieldably resisting movement of said portion of said cam surface in a direction away from said first portion of said control arm, said portion of said cam siurface projecting outwardly from said cam surface a distance farther than the distance which said first portion of said control arm must be moved in order to move said second portion thereof into engagement with said solenoid, wherein after said second portion of said control arm is in engagement with said solenoid said first portion of said control arm displaces said outwardly projecting portion of said cam surface against the urging of said yieldable resisting means as said outwardly projecting portion of said cam surface slides past said first portion of said control arm in response to further movement of said cam member.

6. The cam driven actuating mechanism according to claim 5, wherein said means for yieldably resisting movement of said portion of said cam surface includes said cam member having a resilient arm thereon which has one end fixedly secured to said cam member, said resilient arm extending in approximately the same direction as and having thereon a section of said cam surface adjacent said outwardly projecting portion of said cam surface, and said resilient arm having at the other end thereof remote from said one end said outwardly projecting portion of said cam surface.

7. The cam driven actuating mechanism according to claim 6, wherein said cam member is supported for rotation about an axis and said movement thereof is rotational movement about said axis.

8. The cam driven actuating mechanism according to claim 7, wherein in the region of said outwardly projecting portion said cam surface is generally arcuate and substantially concentric to said axis of rotation of said cam member, and wherein said resilient arm is arcuate and extends generally circumferentially of said axis of rotation, said end of said resilient arm which has thereon said outwardly projecting portion of said cam surface being movable approximately radially of said axis of rotation of said cam member through flexing of said resilient arm.

9. The cam driven actuating mechanism of claim 8, wherein said second portion of said control arm is a core plate, wherein said control arm is supported for pivotal movement about an axis which extends parallel to said axis of rotation of said cam member, and including means for resiliently biasing said control arm in a direction causing said second portion thereof to move away from said solenoid, said biasing means including a helical expansion spring having one end connected to said control arm at a location spaced radially from said pivot axis thereof and having its other end connected to a stationary part of said tape player.

10. The cam driven actuating mechanism of claim 9, including a movably supported head base having thereon a tape head, including an additional cam surface provided on said cam member, and means responsive to rotation of said cam member and said additional cam surface thereon for effecting movement of said head base.

11. The cam driven actuating mechanism according to claim 7, wherein said cam surface includes a stop portion which is spaced angularly from said outwardly projecting portion and which, when engaged with said first portion of said control arm, prevents rotation of said cam member, and including selectively actuable means for moving said control arm to a position in which said first portion thereof is spaced from said stop portion of said cam surface.

12. The cam driven actuating mechanism of claim 11, wherein said cam member is a gear having teeth extending around a peripheral edge thereof and having a cutout region along said peripheral edge which is free of gear teeth, wherein said means for effecting movement of said cam member includes a rotating drive gear disposed adjacent said cam member and engageable with said gear teeth thereon, said cutout region being angularly aligned with said drive gear when said stop portion of said cam surface is engaging said first portion of said control arm.

13. The cam driven actuating mechanism of claim 11, wherein said means for moving said control arm to a position in which said first portion thereof is spaced from said stop portion of said cam surface includes a pivotally supported core arm having a pin thereon which can engage and effect pivotal movement of said control arm during pivotal movement of said core arm, and includes an additional solenoid which is operatively coupled to said core arm, actuation of said additional solenoid effecting movement of said core arm which causes said pin thereon to engage and effect movement of said control arm.

14. The cam driven actuating mechanism of claim 13, including a pivotally supported misoperation preventing arm which is movable to a position in which a surface thereon engages said pin on said core arm and prevents pivotal movement of said core arm in response to actuation of said additional solenoid, and including resilient means yieldably urging said misoperation preventing arm toward said position thereof in which said surface thereon engages said pin on said core arm.

* * * * *